United States Patent [19]

Schenk

[11] 4,039,135
[45] Aug. 2, 1977

[54] COUPLING DEVICE

[75] Inventor: Peter Schenk, West Islip, N.Y.

[73] Assignee: Dzus Fastener Co., Inc., West Islip, N.Y.

[21] Appl. No.: 650,294

[22] Filed: Jan. 19, 1976

[51] Int. Cl.$^2$ .................... H02G 3/10; H02G 3/08; F16B 2/24
[52] U.S. Cl. .................... 248/214; 248/DIG. 6; 248/342
[58] Field of Search .................... 248/214, 228, DIG. 6, 248/342; 174/61, 62, 63

[56] References Cited

U.S. PATENT DOCUMENTS

| | | | |
|---|---|---|---|
| 2,269,228 | 1/1942 | Rugg | 248/DIG. 6 |
| 2,758,810 | 8/1956 | Good | 248/214 X |
| 2,824,167 | 2/1958 | Bauer | 174/63 |
| 2,925,236 | 2/1960 | Cook et al. | 248/214 X |
| 2,962,252 | 11/1960 | Frank | 248/DIG. 6 |

*Primary Examiner*—J. Franklin Foss
*Attorney, Agent, or Firm*—Kane, Dalsimer, Kane, Sullivan and Kurucz

[57] ABSTRACT

A coupling device for mounting an article to a support. The device includes a base adapted to be mounted to a support. At least one depending leg terminating in a locking flange extends from the base. Each flange has a first configuration permitting it to be inserted through the aperture in the article to be coupled with the support. Additionally, each flange is adapted to be shifted to a second configuration to engage with the surface of the article surrounding the opening and opposite the surface adjacent to support to thereby mount the article to the support.

12 Claims, 10 Drawing Figures

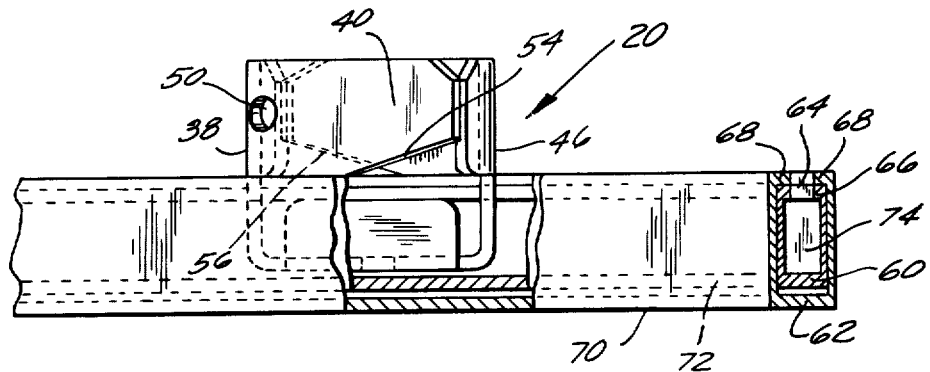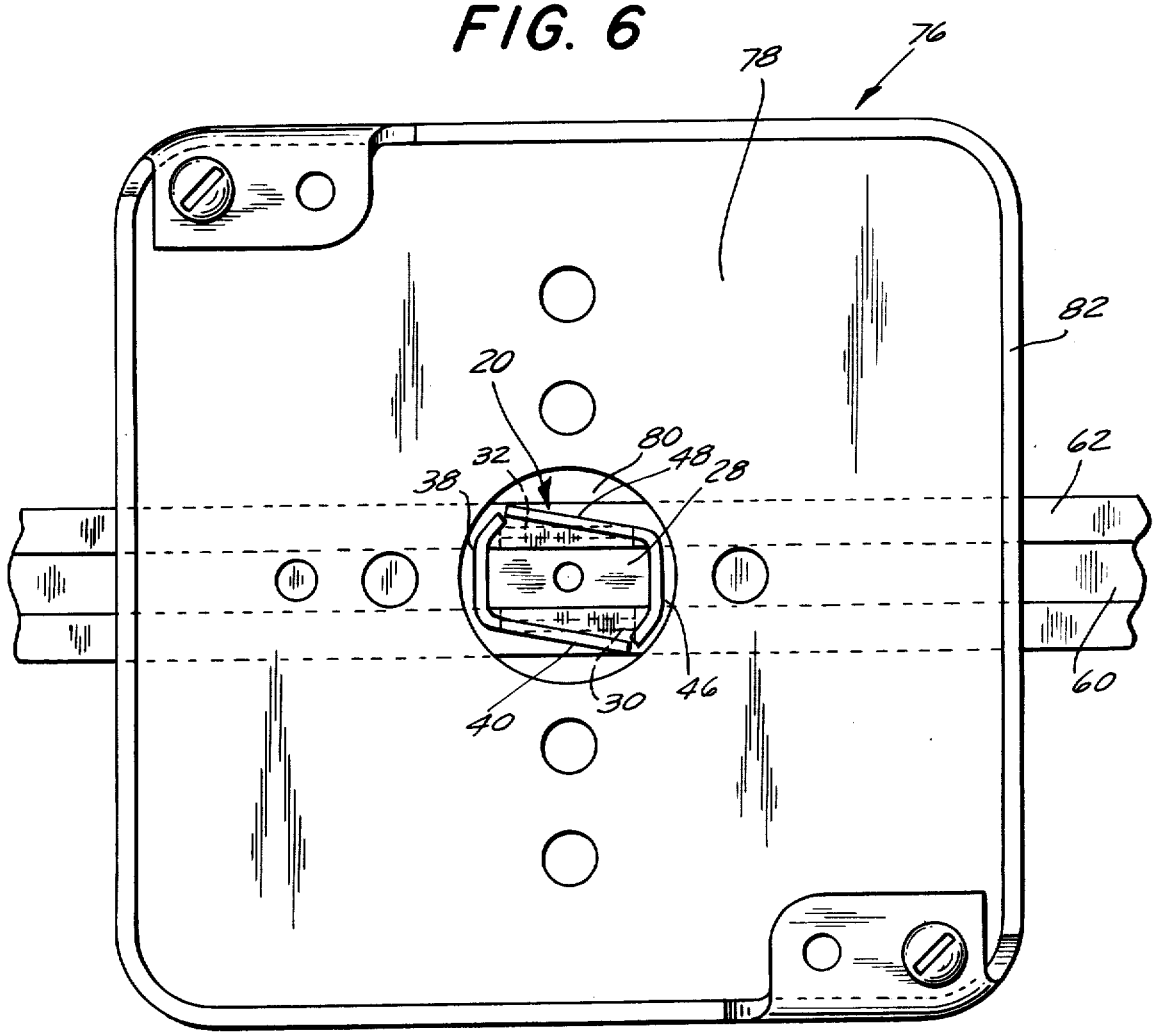

COUPLING DEVICE

BACKGROUND OF THE INVENTION

The mounting of articles to support surfaces can be accomplished in a variety of different ways and with a variety of different materials. In dealing with certain articles there are certain criteria which are necessary in order to assist in mounting the article in a desirable and proper manner and often rather complex fasteners are necessary for that purpose. For example, in the mounting of electrical junction boxes in a house for typical type of electrical connections, it is conventional proceedure to place a telescopic arrangement of members between beams at 16 inch centers and then hang the junction box from the telescopic arrangement for the electrical wiring and fixtures.

The mechanism commonly used hold the junction box in position is slideably mounted in the telescopic members for proper positioning and then extends through a central opening in the junction box. The device commonly in use today employ a three piece arrangement. The first piece is slideably mounted in the telescoping members, the second piece engages with the inner surface of the junction box and a third piece in the form of a screw extends through threaded openings in the two aligned pieces and by threaded interengagement holds the junction box in position.

It can be readily invisioned how this type of coupling device is rather unwieldy to handle and utilize particularly with the worker having only two hands. Also three separate pieces presents the danger of dropping or losing a piece. Furthermore the pieces must be properly aligned and held in the proper relative position until the fastening is accomplished. The operation is quite time consuming and inefficient as well as being annoying to the worker.

It is apparent that a one piece fastener would be an extreme advantage in this type of environment. Naturally the one piece fastener could be adapted for use in other similar environments were milti-piece fasteners are necessary to mount an article to the support.

SUMMARY OF THE INVENTION

With the above background in mind, it is among the primary objectives of the present invention to provide a one piece fastener for mounting an article such as a junction box in proper position to the supporting surface. In the environment there is the conventional components being fastened together, for example, the telescoping arrangement is still employed on the wall surface and properly positioned within the 16 inch beams and there need be no change in the general structure of the juncture box. It is of the conventional type having the central aperture to receive the fastening structure. The device is of a one piece design with a structure thereon which provides a base portion for positioning in the telescoping members and additionally has a downwardly extending portion which is initially sized to pass through the opening in the junction box. The downwardly extending portion has parts thereof which are adapted to be bent to engage with the inner surface of the junction box to lock the junction box in position. To facilitate use of the mechanism, the structure is designed for automatic centering and provides appropriate weakned zones to facilitate the shifting from the first configuration to the second locking configuration. The structure is shaped to engage tightly with the article to hold the junction box tightly against the telescoping rails and support structure. Furthermore, a further form of the device includes an extension which is designed for removably mounting a fixture thereto when such a feature is desirable with respect to the junction box. Once again the overall structure is an integral one piece design of minimum components, of low cost construction and one which is easy and efficient to utilize and install. Naturally it should be kept in mind that the one piece design is adaptable for use in fastening articles other than junction boxes to support structures.

In summary, the coupling device of the present invention is designed for mounting an article to a support. The device includes a base adapted to be mounted to the support. At lease one depending leg terminating in a locking flange extends from the base. Each flange has a first configuration permitting it to be inserted through the aperture in the article to be coupled with the support. Each flange is adapted to be shifted to a second configuration to engage with the surface of the article surrounding the opening and opposite the surface adjacent the support to thereby mount the article to the support.

With the above objectives among others in mind, references had to the attached drawings.

BRIEF DESCRIPTION OF THE DRAWINGS

In the drawings:

FIG. 5 is a side elevation view thereof showing the coupling device mounted in a pair of telescoping rails;

FIG. 6 is a top plan view thereof showing the device mounted in the telescoping rails and pass through the aperture in a junction box;

DESCRIPTION OF THE PREFERRED EMBODIMENTS

Coupling device 20 as shown in the depicted embodiments is designed for use in coupling a junction box used for electrical connections to a wall or ceiling or floor support structure. Naturally the coupling device is designed for use in attaching the many different types of articles to a support surface. However, for explanatory purposes, the device will be described for use in the electrical junction box environment.

The one piece unitary coupling device 20 can be constructed of a conventional material such as a well known metal or plastic as long as the material has sufficient strength to maintain the joint relationship between the junction box and the support and that the flange portions of the device 20 are capable of being deformed to achieve the locking action as will be discussed in detail below.

Figure 1:
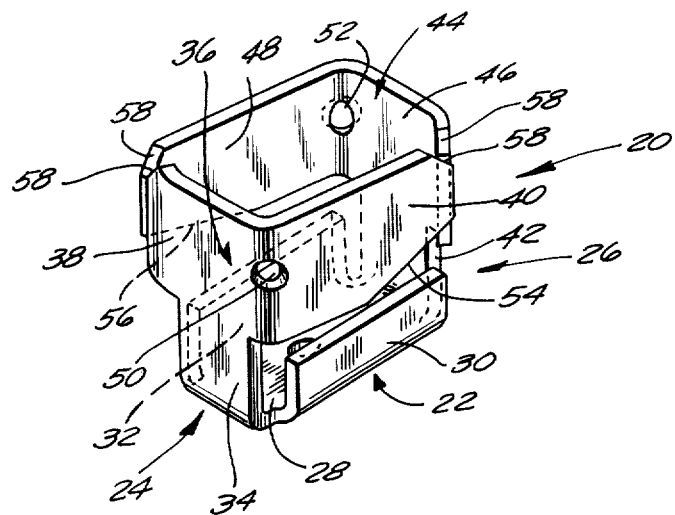
FIG. 1 is a perspective view of the coupling device of the invention prior to use.
Figure 2:
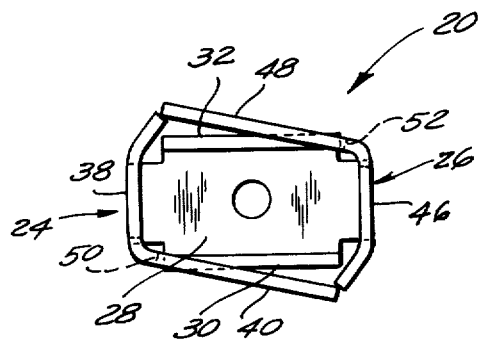
FIG. 2 is a bottom plan view thereof.
Figure 3:
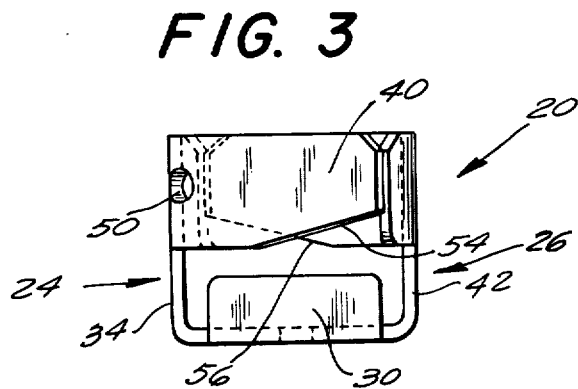
FIG. 3 is a side elevation view thereof.
Figure 4:
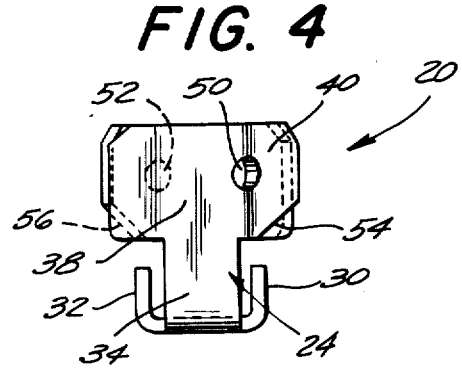
FIG. 4 is an end elevation view thereof.
Figure 7:
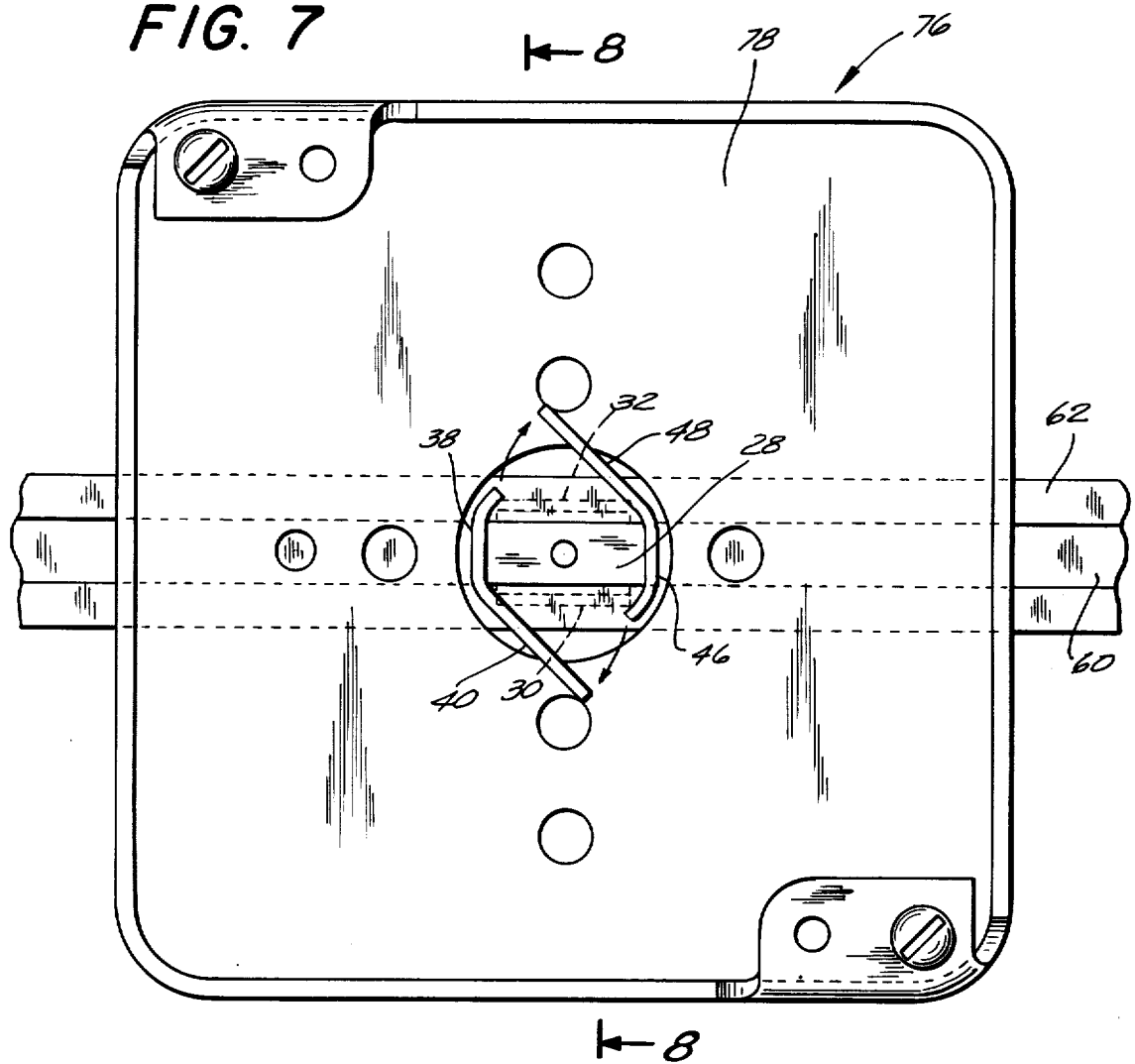
FIG. 7 is a bottom plan view of the device mounted in the rails and in position to hold a junction box in place with arrows showing the direction of deformation of the device to the locking position.
Figure 8:
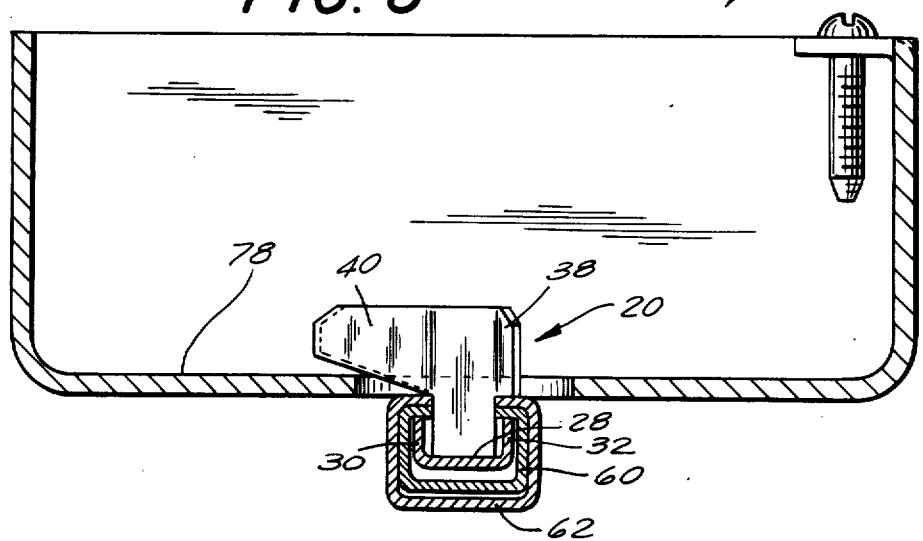
FIG. 8 is a sectional view thereof taken along the plane of line 8—8 of FIG. 7.

Device 20 includes a base portion 22 and a pair of opposing leg portions 24 and 26 depending therefrom. The base has a rectangular body 28 and a pair of integral downwardly extending skirt portions 30 and 32 extending from the longer sides of body 28. The adjacent portion 34 of leg 24 extending from body 28 is spaced from the adjacent edges of skirt 30 and 32 and terminates in a L-shaped flange 36. The laterally extending flange 36 includes a shorter leg 38 and a longer leg 40. A similar arrangement exists with respect to opposing leg 26. The narrower adjacent portion 42 extends away from body 28 and is integrally formed with an L-shaped flange 44 having a shorter leg 46 and a longer leg 48. In the initial configuration the shorter legs 38 and 46 are opposed and generally parallel and the longer legs 40 and 48 are opposed and generally parallel. The distal terminal edges of the flanges 36 and 44 are adjacent to and free from one another to permit their individual deformation. To facilitate deformation from the initial configuration as shown in FIGS. 1-6 to the second configurations as shown in FIGS. 7 and 8 points of weakness are provided in flanges 36 and 44 for purposes of the deformation without having any material effect on the locking strength of the coupling device. In this respect, at the hinge point of the legs of flange 36 an opening 50 is provided and a similar opening 52 is provided at the hinge point of flange 44. Furthermore, the outer portion 54 of the upper surface of longer leg 40 is beveled to reduce the size of the free end and a similar portion 56 of leg 48 is beveled in a similar manner. Additionally, the leading edges all four legs of flanges 36 and 44 contain bevels of 58 at their exposed tips to facilitate entrance through an appropriate aperture when device 20 is utilized.

In FIG. 5 device 20 is shown coupled with a pair of telescoping brackets or members which are conventionally used for mounting electrical junction boxes to wall or ceiling surfaces. The telescoping arrangement includes an inner U-shaped bracket 60 slideably mounted within an outer U-shaped bracket 62. The legs of the U-shaped brackets are aligned so that the opened ends of the brackets are aligned to form through opening 64 for passage of the legs of coupling device 20 therethrough. An inwardly extending pair of ledges or rims 66 are on inner member 60 at the open end and a corresponding pair of inwardly extending ledges or rims 68 are formed on outer member 62 and aligned with rims 66. The rims form a track or shoulder for slotting reception of portions of coupling device 20. The upper surface 70 of outer telescoping member 62 is adapted to be mounted in a conventional fashion to ceiling, floor or wall beams. In a similar the upper surface 72 of the other telescoping members 60 is adapted to be mounted to the ceiling, floor or wall structure.

By permitting the members to telescoping they can be expanded or contracted so as to be conveniently mounted on whatever surfaces are available. For example, it is conventional to mount the telescoping members to a pair of beams which are separated at 16 inch intervals.

Coupling device 20 is mounted to the telescoping members by passing the base through one open end 74 and sliding it to a desired position. The bottom edges of the skirt portions 30 and 32 seat on the upper surfaces of ledges or rims 66 and 68 to capture the base 24 therein. The opening 74 is larger then the base so that it can be slideably shifted within the telescoping members. The narrower portions 34 and 42 of legs 24 and 26 extend through the aligned opening 64 so that the L-shaped flanges 36 and 44 extend below the telescoping members in position for coupling with a junction box 76.

The junction box 76 includes a flat base 78 with a central opening 80 therein and a peripheral skirt 82 so as to form an inner chamber to house appropriate electrical connections. The aperture 80 is large enough to receive the flanges 36 and 46 therethrough when in an initial configuration as shown in FIGS. 1-6. The rectangular shape of the flanges in this condition facilitates centering of the coupling device with respect to the junction box and the junction box in respect to the supporting structure.

After the one piece coupling device 20 has been slideably mounted in position on the telescoping tracks 60 and 62 and junction box 76 has been positioned with a flange extending through aperture 80, the longer legs of the flanges can be defoemed and bent outward and away from the shorter legs as shown by the arrows in FIG. 7. This brings the upper edge of each flange into interfering and locking engagement with the under surface of junction box base. In this manner, the junction box is fixed in position with respect to the rails and the supporting structure in general. To facilitate ease of deformation of the longer legs 40 and 48, zones of weakness are provided at appropriate positions such as by use of openings 50 and 52 and surfaces 54 and 56. Thus, the junction box is fixed in position and no further component parts are necessary for the fastening operation. It should also be noted that ease of assembly and fastening is facilitated by the bevel 58 on the locking edges of flanges 38 and 46.

Figure 9:
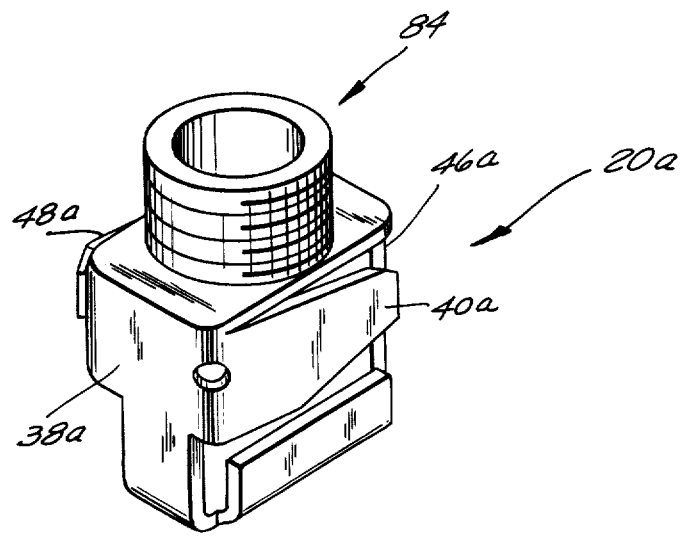
FIG. 9 is a perspective view of an alternative embodiment of the coupling device of the invention.
Figure 10:
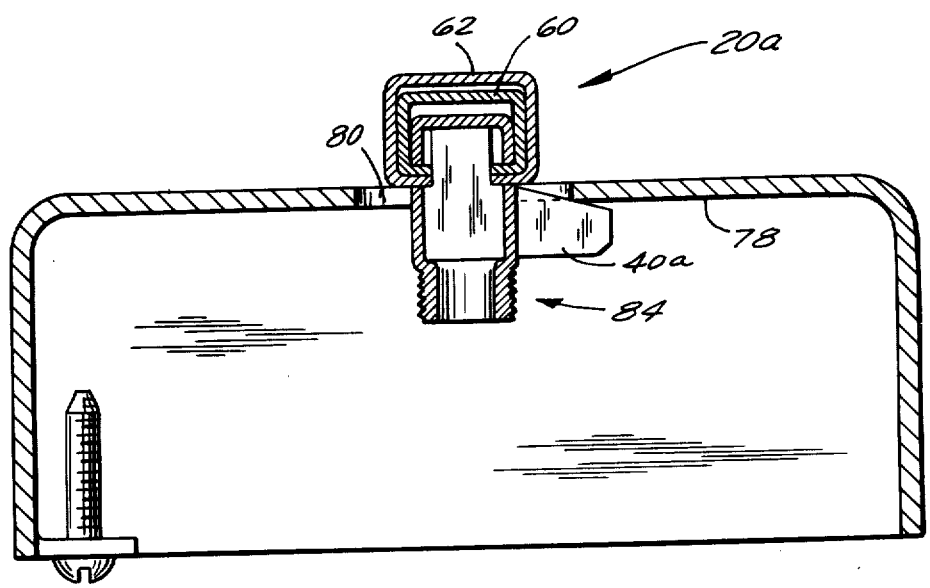
FIG. 10 is a sectional view thereof showing the alternative form of the device holding a junction box to a set of telescoping support rails.

An alternative form of coupling device 20a is depicted in FIGS. 9 and 10 with like components to those described in connection with the previously discussed embodiment bearing the subscript "a". The actual components which accomplish the fastening for coupling of the junction box to the rails is vertually the same as with the previous embodiment. The difference in structure resides in the provision of an additional projecting portion extending from the under surface of the flanges 36a and 46a. This projecting portion 84 is integrally formed or, alternatively, attached to two opposing legs of the L-shaped flanges. Preferably the attachment is made to the shorter stationary legs so that the other two opposing longer legs are free to be deformed or bent into locking engagement with the under surface of the junction box base 78 to accomplish the coupling and locking function. As shown, the projecting portion 84 contains a threaded outer surface 86 which is adapted to receive a corresponding threaded inner surface on a mating portion of a fixture assembly. In this manner, a fixture can be mounted to the junction box assembly fastened to the ceiling, floor or wall without the use of additional components. Projection 84 is formed as part of the one piece coupling 20a and is dimensioned so that it will fit through aperture 80 in the junction box and be in position for coupling with an appropriate fixture. Naturally other coupling means can be utilized in place of the threaded outer surface on the projection 84. There are many other convenient and conventional structures which are employed for this purpose.

Thus the several aforenoted objects and advantages are most effectively attained. Although several somewhat preferred embodiments have been disclosed and described in detail herein, it should be understood that this invention is in no sense limited thereby and its scope is to be determined by that of the appended claims.

I claim:

1. A one-piece coupling device for mounting an article to a support comprising; a base adapted to be mounted to a support independent of a separate fastener element, at least one depending leg terminating in a locking flange extending from the base and integrally formed therewith, each flange having a first configuration permitting it to be inserted through an aperture in an article to be coupled with a support, and each flange adapted to be shifted to a second configuration to engage with the surface of the article surrounding the opening and opposite the surface adjacent the support to thereby mount the article to the support independent of a separate fastener element.

2. A coupling device for mounting an article to a support comprising; a base adapted to be mounted to a support, at least one depending leg terminating in a locking flange extending from the base, each flange having a first configuration permitting it to be inserted through an aperture in an article to be coupled with a support, and each flange adapted to be shifted to a second configuration to engage with the surface of the article surrounding the opening and opposite the surface adjacent the support to thereby mount the article to the support, two legs and two corresponding flanges arranged in a symmetrical pattern in extending from the base, each leg depending downwardly from an opposing end of the base and terminating intermediate the ends of an L-shaped laterally extending flange with each shorter leg of the flange being parallel and spaced apart and each longer leg of a flange being spaced apart and parallel so as to form a substantially rectangular first configuration to facilitate passage through the aperture of an article and centering thereof with respect to the article.

3. The invention in accordance with claim 2 wherein the coupling device is unitary in structure with the base, leg and flange being integrally formed.

4. The invention in accordance with claim 2 wherein there are two legs and two corresponding flanges arranged in a symmetrical pattern in extending from the base.

5. The invention in accordance with claim 2 wherein fixture mounting means extend downwardly from the under side of at least one flange to facilitate mounting of a fixture within the article fastened to the support.

6. The invention in accordance with claim 5 wherein the fixture mounting means is a threaded projection to receive a corresponding threaded portion of a fixture.

7. The invention in accordance with claim 2 wherein the flanges are adapted to be deformed to a second configuration with the larger leg of each flange being bent outwardly so that after the flanges in the first configuration have been inserted into aperture in the article and then deformed into the second configuration the upper surface of the longer leg of each flange will engage with the article and capture the article between the base and the flanges.

8. The invention in accordance with claim 7 wherein the portion of each flange joining the two legs of the flange has a weakened zone to facilitate deforming of the flanges from the first to the second configuration.

9. The invention in accordance with claim 8 wherein weakened zones are formed by providing a hole in the portion of each flange where the legs of the flange meet.

10. The invention in accordance with claim 8 wherein the longer leg of each flange has a beveled under surface to facilitate the deformation of the longer leg between the first and second configuration.

11. A coupling device for mounting an article to a support comprising; a base adapted to be mounted to a support, at least one depending leg terminating in a locking flange extending from the base, each flange having a first configuration permitting it to be inserted through an aperture in an article to be coupled with a support, and each flange adapted to be shifted to a second configuration to engage with the surface of the article surrounding the opening and opposite the surface adjacent the support to thereby mount the article to the support, two legs and two corresponding flanges arranged in a symmetrical pattern extending from the base, the base being substantially rectangular in configuration with a flat upper surface having a pair of opposed skirt portions extending downwardly from the longer sides of the upper surface and a leg extending downwardly from each of the shorter sides of the upper surface of the base, the skirt portions being shorter than the leg portions from which the flange extends so as to provide space between the skirt portions and the flanges of the legs thereby permitting the skirt portions and upper surface of the base to be mounted to the support with the flanges extending downwardly therefrom and spaced from the skirt portions so as to capture an article surface therebetween.

12. A coupling device for mounting an article to a support comprising; a base adapted to be mounted to a support, at least one depending leg terminating in a locking flange extending from the base, each flange having a first configuration permitting it to be inserted through an aperture in an article to be coupled with a support, and each flange adapted to be shifted to a second configuration to engage with the surface of the article surrounding the opening and opposite the surface adjacent the support to thereby mount the article to the support, the article to be fastened to the support being an electrical junction box having a central aperture therein and the means on the support to receive the junction box being a pair of telescoping U-shaped rails mounted in fixed position with the open end facing the junction box and the opposing side walls of the U-shaped rails terminating in an inwardly extending rim, the opening formed within the rails being large enough to receive the base with the bottom edges of the skirt portions riding on the opposing rims and the leg portions above the flanges extending through the opening in the bottom of the rails thereby capturing the coupling device in slideable depending position within the telescoping rails with the flanges on the legs extending downwardly from the rails for passage through the aperture in the junction box and engaging with the surface surrounding the aperture when deformed into the second configuration to lock the junction box to the rails.

* * * * *